United States Patent
Chen et al.

(10) Patent No.: US 7,650,494 B2
(45) Date of Patent: Jan. 19, 2010

(54) METHOD AND APPARATUS FOR USE IN RELATION TO VERIFYING AN ASSOCIATION BETWEEN TWO PARTIES

(75) Inventors: Liqun Chen, Bristol (GB); Keith Alexander Harrison, Monmouthshire (GB); David Soldera, Wellington (NZ)

(73) Assignee: Hewlett-Packard Development Company, L.P., Houston, TX (US)

( * ) Notice: Subject to any disclaimer, the term of this patent is extended or adjusted under 35 U.S.C. 154(b) by 1284 days.

(21) Appl. No.: 10/613,522

(22) Filed: Jul. 2, 2003

(65) Prior Publication Data
US 2004/0123098 A1 Jun. 24, 2004

(30) Foreign Application Priority Data
Jul. 5, 2002 (GB) .................................. 0215590.1

(51) Int. Cl.
*H04L 9/00* (2006.01)
(52) U.S. Cl. .......................... 713/155; 380/30; 380/45; 380/277; 380/282; 713/157; 713/171
(58) Field of Classification Search .................. 713/155, 713/170, 171, 157, 180; 380/30, 44, 277, 380/45
See application file for complete search history.

(56) References Cited

U.S. PATENT DOCUMENTS

| | | | |
|---|---|---|---|
| 5,124,117 A | 6/1992 | Tatebayashi et al. | 380/21 |
| 5,920,630 A * | 7/1999 | Wertheimer et al. | 380/286 |
| 6,185,685 B1 | 2/2001 | Morgan et al. | 713/183 |
| 6,792,530 B1 | 9/2004 | Qu et al. | |
| 6,941,457 B1 * | 9/2005 | Gundavelli et al. | 713/163 |
| 7,076,656 B2 | 7/2006 | MacKenzie | 713/171 |
| 7,113,594 B2 | 9/2006 | Boneh et al. | |
| 7,239,701 B1 * | 7/2007 | Ogishi et al. | 380/44 |
| 7,263,191 B2 | 8/2007 | Chen et al. | |
| 7,337,322 B2 | 2/2008 | Gentry et al. | 713/176 |
| 7,349,538 B2 | 3/2008 | Gentry et al. | 380/30 |
| 7,353,395 B2 * | 4/2008 | Gentry et al. | 713/171 |
| 2002/0164026 A1 * | 11/2002 | Huima | 380/247 |
| 2003/0081785 A1 * | 5/2003 | Boneh et al. | 380/277 |
| 2003/0179885 A1 * | 9/2003 | Gentry et al. | 380/277 |

(Continued)

OTHER PUBLICATIONS

K.C. Reddy et al, Identity Based Authenticated Group Key Agreement Protocol, pp. 215-233, Springer, 2002.*

(Continued)

*Primary Examiner*—Nasser G Moazzami
*Assistant Examiner*—Shanto M Abedin

(57) ABSTRACT

A first party has a first and a second cryptographic key. A second party has a third and a fourth cryptographic key, the fourth cryptographic key being derived from the first and third cryptographic keys thereby providing an association between the parties. To enable a third party to verify the existence of an association between the first and second parties, the second party generates a number that in association with the second cryptographic key, the third cryptographic key and the fourth cryptographic key define a first cryptographic parameter, a second cryptographic parameter and a third cryptographic parameter respectively. By using these parameters and the second and third cryptographic keys, the third party can verify if the first and second parties are associated.

18 Claims, 4 Drawing Sheets

U.S. PATENT DOCUMENTS

| | | | |
|---|---|---|---|
| 2003/0182554 A1* | 9/2003 | Gentry et al. | 713/171 |
| 2003/0198348 A1* | 10/2003 | Mont et al. | 380/277 |
| 2004/0123098 A1 | 6/2004 | Chen et al. | |
| 2004/0131191 A1 | 7/2004 | Chen et al. | 380/282 |
| 2005/0005100 A1 | 1/2005 | Chen et al. | 713/161 |
| 2005/0005121 A1 | 1/2005 | Chen et al. | 713/171 |
| 2005/0021973 A1 | 1/2005 | Chen et al. | 713/176 |
| 2005/0022102 A1* | 1/2005 | Gentry | 715/500 |

OTHER PUBLICATIONS

Gentry, C., et al., "Hierarchical ID-Based Cryptography", Lecture notes in Computer Science, vol. 2501, pp. 548-566 (2002).

Boneh, Dan, et al., "Identity-Based Encryption from the Weil Pairing," *Advances in Cryptology-CRYPTO 2001*, pp. 1-31.

Frey, Gerhard, et al., "The Tate Pairing and the Discrete Logarithm Applied to Elliptic Curve Cryptosystems," *IEEE Transactions on Information Theory*, Oct. 7, 1998, pp. 1-5.

* cited by examiner

METHOD AND APPARATUS FOR USE IN RELATION TO VERIFYING AN ASSOCIATION BETWEEN TWO PARTIES

FIELD OF THE INVENTION

The present invention relates to a method and apparatus for use relation to verifying an association between two parties by cryptographic techniques; in particular, but not exclusively, the present invention relates to a method and apparatus for enabling the verification, and/or for verifying, an association between a lower-level trusted authority and a higher-level trusted authority in a hierarchy of trusted authorities by using elliptic curve cryptography.

BACKGROUND OF THE INVENTION

With the ever-increasing spread of electronic communication and electronic identification there has been a corresponding increase in demand for cryptographic processes, where users require cryptographic processes to enable encryption of data for security purposes and/or for the purposes of providing identification.

Typically encryption keys are certified by trusted authorities and are disseminated using digital certificates where, to allow wide spread availability of cryptographic processes, a hierarchy of trusted authorities exist. Within a hierarchy of trusted authorities a root trusted authority issues a digital certificate relating to a private/public key to a second level trusted authority by using the root authority's private key to sign the second level's trusted authority's public key and thereby providing confirmation that the second level private key is authorized by the root authority. Correspondingly the second level trusted authority issues a digital certificate relating to a different private/public key to a third level trusted authority that is signed with the second level's private key and so forth. However, for a user to determine that the public key associated with the third level trusted authority is derived with the authority of the root trusted authority it is necessary for the user to trace the digital certificates that incorporated the various public keys.

It is desirable to improve this situation.

Embodiments of the present invention to be described hereinafter make use of cryptographic techniques using bilinear mappings. Accordingly, a brief description will now be given of certain such prior art techniques.

In the present specification, $G_1$ and $G_2$ denote two algebraic groups of prime order q in which the discrete logarithm problem is believed to be hard and for which there exists a computable bilinear map p, for example, a Tate pairing t or Weil pairing ê. Thus, for the Weil pairing:

$$\hat{e}: G_1 \times G_1 \to G_2$$

where $G_2$ is a subgroup of a multiplicative group of a finite field. The Tate pairing can be similarly expressed though it is possible for it to be of asymmetric form:

$$t: G_1 \times G_0 \to G_2$$

where $G_0$ is a further algebraic group the elements of which are not restricted to being of order q. Generally, the elements of the groups $G_0$ and $G_1$ are points on an elliptic curve though this is not necessarily the case.

As is well known to persons skilled in the art, for cryptographic purposes, a modified form of the Weil pairing is used that ensure $p(P, P) \neq 1$ where $P \in G_1$; however, for convenience, the pairing is referred to below simply by its usual name without labeling it as modified. Further background regarding Weil and Tate pairings and their cryptographic uses can be found in the following references:

G. Frey, M. Müller, and H. Rück. The Tate pairing and the discrete logarithm applied to elliptic curve cryptosystems. *IEEE Transactions on Information Theory*, 45(5): 1717-1719, 1999.

D. Boneh and M. Franklin. Identity based encryption from the Weil pairing. In *Advances in Cryptology—CRYPTO 2001*, LNCS 2139, pp. 213-229, Springer-Verlag, 2001.

For convenience, the examples given below assume the use of a symmetric bilinear map ($p: G_1 \times G_1 \to G_2$) with the elements of $G_1$ being points on an elliptic curve; however, these particularities, are not to be taken as limitations on the scope of the present invention.

As the mapping between $G_1$ and $G_2$ is bilinear exponents/multipliers can be moved around.

For example if a, b, $c \in F_q$ and P, $Q \in G_1$ then $$t(aP, bQ)^c = t(aP, cQ)^b = t(bP, cQ)^a = t(bP, aQ)^c = t(cP, aQ)^b = t(cP, bQ)^a$$

$$= t(abP, Q)^c = t(abP, cQ) = t(P, abQ)^c = t(cP, abQ)$$

$$= \ldots$$

$$= t(abcP, Q) = t(P, abcQ) = t(P, Q)^{abc}$$

Additionally, the following cryptographic hash functions are defined:

$$H_1: \{0,1\}^* \to G_1$$

$$H_2: \{0,1\}^* \to F_q$$

$$H_3: G_2 \to \{0,1\}^*$$

A normal public/private key pair can be defined for a trusted authority:

the private key is s where $s \in F_q$ the public key is (P,R) where $P \in G_1$ and $R \in G_1$, with R=sP Additionally, an identifier based public key/private key pair can be defined for a party with the cooperation of the trusted authority. As is well known to persons skilled in the art, in "identifier-based" cryptographic methods a public, cryptographically unconstrained, string is used in conjunction with public data of a trusted authority to carry out tasks such as data encryption or signing. The complementary tasks, such as decryption and signature verification, require the involvement of the trusted authority to carry out computation based on the public string and its own private data. Frequently, the string serves to "identify" the intended message recipient and this has given rise to the use of the label "identifier-based" or "identity-based" generally for these cryptographic methods. However, depending on the application to which such a cryptographic method is put, the string may serve a different purpose to that of identifying the intended recipient and, indeed, may be an arbitrary string having no other purpose than to form the basis of the cryptographic processes.

Accordingly, the use of the term "identifier-based" herein in relation to cryptographic methods and systems is to be understood simply as implying that the methods and systems are based on the use of a cryptographically unconstrained string whether or not the string serves to identify the intended recipient. Furthermore, as used herein the term "string" is simply intended to imply an ordered series of bits whether derived from a character string, a serialized image bit map, a digitized sound signal, or any other data source.

In the present case, the identifier-based public/private key pair defined for the party has a public key $Q_{ID}$ and private key $S_{ID}$ where $Q_{ID}, S_{ID} \in G_1$. The trusted authority's normal public/private key pair (P,R/s) is linked with the identifier-based public/private key by $$S_{ID}=sQ_{ID} \text{ and } Q_{ID}=H_1(ID)$$

where ID is the identifier string for the party.

Some typical uses for the above described key pairs will now be given with reference to FIG. 1 of the accompanying drawings that depicts a trusted authority 10 with a public key (P, sP) and a private key s. A party A serves as a general third party whilst for the identifier-based cryptographic tasks (IBC) described, a party B has an IBC public key $Q_{ID}$ and an IBC private key SID.

Standard Signatures (See Dashed Box 2): The holder of the private keys (that is, the trusted authority 1 or anyone to whom the latter has disclosed s) can use s to sign a bit string; more particularly, where m denotes a message to be signed, the holder of s computes:

$$V=sH_1(m).$$

Verification by party A involves this party checking that the following equation is satisfied:

$$t(P, V)=t(R, H_1(m))$$

This is based upon the mapping between $G_1$ and $G_2$ being bilinear exponents/multipliers, as described above. That is to say, $$t(P, V) = t(P, sH_1(m))$$
$$= t(P, H_1(m))^s$$
$$= t(sP, H_1(m))$$
$$= t(R, H_1(m))$$

Identifier-Based Encryption (See Dashed Box 3):—Identifier based encryption allows the holder of the private key SID of an identifier based key pair (in this case, party B) to decrypt a message sent to them encrypted (by party A) using B's public key $Q_{ID}$.

More particularly, party A, in order to encrypt a message m, first computes:

$$U=rP$$

where r is a random element of $F_q$. Next, party A computes:

$$V=m \oplus H_3(t(R, rQ_{ID}))$$

Party A now has the ciphertext elements U and V which it sends to party B.

Decryption of the message by party B is performed by computing:

$$V \oplus H_3(t(U, S_{ID})) = V \oplus H_3(t(rP, sQ_{ID}))$$
$$= V \oplus H_3(t(P, Q_{ID})^{rs})$$
$$= V \oplus H_3(t(sP, rQ_{ID}))$$
$$= V \oplus H_3(t(R, rQ_{ID}))$$
$$= m$$

Identifier-Based Signatures (See Dashed Box 4):—Identifier based signatures using Tate pairing can be implemented. For example:

Party B first computes:

$$r=t(S_{ID}, P)^k$$

where k is a random element of $F_q$.

Party B then apply the hash function $H_2$ to m‖r (concatenation of m and r) to obtain:

$$h=H_2(m\|r).$$

Thereafter party B computes $$U=(k-h)S_{ID}$$

thus generating the output U and h as the signature on the message m.

Verification of the signature by party A can be established by computing:

$$r'=t(U, P) \cdot t(Q_{ID}, R)^h$$

where the signature can only be accepted if $h=H_2(m\|r')$.

It will be recalled that the problem discussed at the outset was how a third party could verify the associations between trusted authorities arranged in a hierarchy without having to follow a trail of certificates. In fact, the above-described IBC encryption/decryption method offers one possible solution. Consider the situation where a trusted authority at one level in the hierarchy has an IBC public key $Q_{ID}$/private key $S_{ID}$ pair with the private key being provided by a trusted authority in the next level up on the basis of the ID of the lower-level trusted authority and the private key s of a normal public key (P, sP)/private key s pair held by the higher-level trusted authority. A third party could then check that the lower-level trusted authority was associated with the higher level one by an IBC-based challenge/response mechanism. More particularly, the third party could encrypt a nonce (random number) using both the public key element sP of the higher-level trusted authority and the IBC public key $Q_{ID}$ of the lower-level trusted authority. The third party sends the encrypted nonce to the lower-level trusted authority and asks it to decrypt and return the nonce—the lower-level trusted authority will only be able to do this if it has (or can get) the key $S_{ID}(=sQ_{ID})$ from the higher-level trusted authority. Thus, if the lower-level trusted authority can return the decrypted nonce, the association between the lower-level trusted authority and the higher level trusted authority is proved. Whilst this approach is viable, it involves an exchange of messages between the third party and the lower-level trusted authority and also (if the lower-level trusted authority does not already have its IBC private key) between the lower-level trusted authority and the higher-level trusted authority. In many situation this may either not be possible or undesirable—for example, the third party may wish to check the association between the trusted authorities offline or the third party may not wish to let it be known that it is carrying out the check.

It is an object of the present invention to provide a way of checking the association between two parties that obviates at least some of the difficulties noted above.

SUMMARY OF THE INVENTION

According to a first aspect of the present invention, there is provided a method of enabling a third party to verify an association between a first party associated with a first element, of a first algebraic group, and a second party associated with a second element, of a second algebraic group, formed from an identifier string of the second party, wherein:

there exists a computable bilinear map for the first and second elements;

the first party has a first secret and computes a first product from the first secret and the first element;

the second party has both a second secret, and a shared secret provided by the first party as the product of the first secret and the second element;

the second party computes first, second and third verification parameters as the product of the second secret with said shared secret, the second element and the first element respectively.

Using the non-secret data elements and a function providing the bilinear mapping, a third party can verify the existence of an association between first and second parties by:

computing the second element from the identifier string of the second party;

carrying out a first check:

p (third verification parameter, computed second element)=p (first element, second verification parameter)

carries out a second check:

p (first element, first verification parameter)=p (first product, second verification parameter)

the association between the first and second parties being treated as verified if both checks are passed.

According to a second aspect of the present invention, there is provided a method of verifying an association between a first party associated with a first element, of a first algebraic group, and a second party associated with a second element, of a second algebraic group; the first and second elements being such that there exists a bilinear mapping p for these elements; the method comprising carrying out the following operations:

receiving both data indicative of said first element, and a first product formed by the first party from a first secret and the first element;

receiving in respect of the second party both an identifier string, and first, second and third verification parameters;

computing the second element from the identifier string of the second party;

carrying out a first check:

p (third verification parameter, computed second element)=p (first element, second verification parameter)

carrying out a second check:

p (first element, first verification parameter)=p (first product, second verification parameter)

the association between the first and second parties being treated as verified if both checks are passed.

According to a third aspect of the present invention, there is provided a method of enabling verification of an association between parties, the method comprising:

generating a first private key and public key for a first party;

generating a second private and public key for a second party wherein the second private key is derived from the first private key and second public key; and generating a third private key for the second party that is used in association with the first public key, the second private key and the second public key to form a first cryptographic parameter, a second cryptographic parameter and a third public key respectively.

The present invention also encompasses apparatus and computer program products both for providing verification parameters enabling verification of an association between two parties, and for carrying out a verification check using these parameters.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
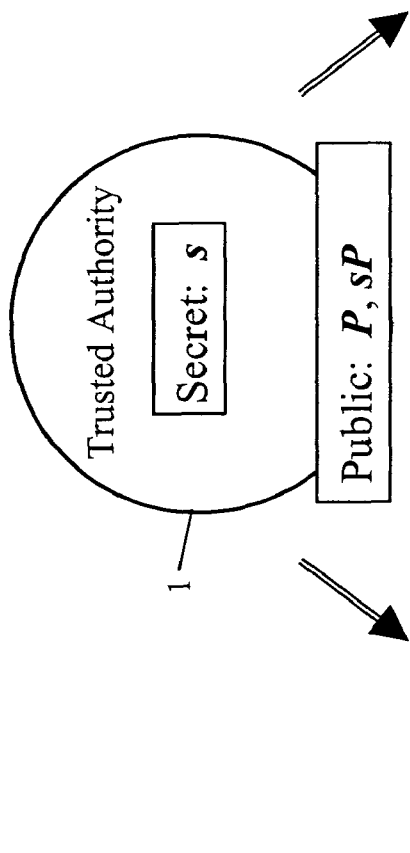
FIG. 1 is a diagram showing prior art cryptographic processes based on elliptic curve cryptography using Tate pairings.
Figure 1:
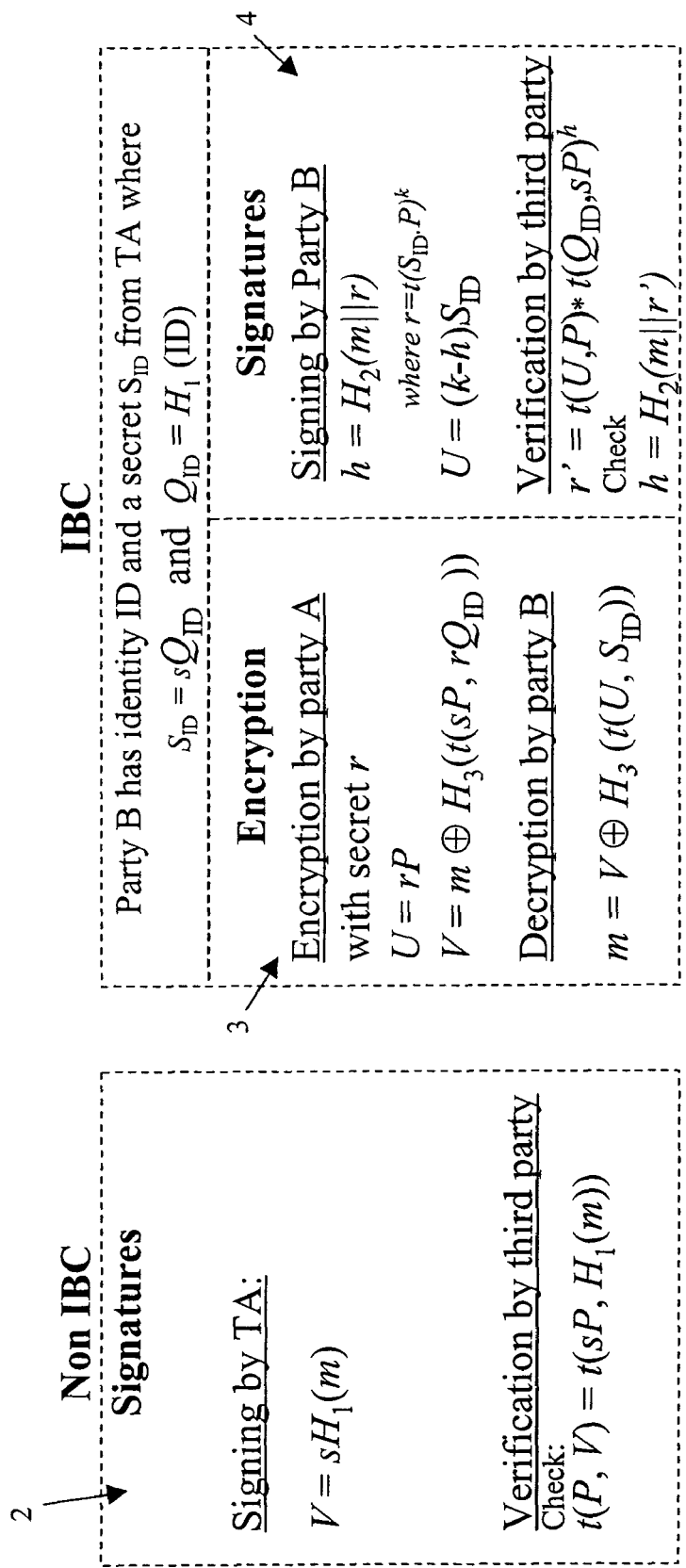

Considering first the situation where there is an association between a first party and a second party which the second party would like to be able to prove to a third party; the nature of the association concerned is not relevant to the present discussion but could, for example, be a trust relationship (e.g. the second party is trusted to act on behalf of the first party in respect of certain matters) or simply a biological relationship (e.g. the first party is a parent and the second is a child of the first party).

In order to enable the second party to prove this association, the first party provides the second party with a secret, herein referred to as a "shared secret", though there is no requirement on the first party to keep a copy of this shared secret after giving it to the second party. The nature of the shared secret is such that it enables the second party to prove its association with the first party without giving away the shared secret.

According to the present invention, the above-described arrangement is enabled by the use of bilinear mappings as will now be explained with reference to embodiments based on modified Tate pairings (though, of course, other pairings such as modified Weil pairings can alternatively be used). The notations and definitions given in the introductory portion of the present specification also apply to what follows.

The first party has its own secret $s_1$ and an associated point P on an elliptic curve. The first party makes P and the combination $s_1 P(=R)$ publicly available in any suitable manner. The second party also has its own secret $s_2$ and an associated point Q on the same elliptic curve as P. The second party makes Q and the combination $s_2Q$ publicly available in any suitable manner. It will be appreciated that reference to an element being made publicly available simply means making it available to third parties who have an interest and right to know the element and does not necessarily imply unrestricted distribution.

The second party is provided with $s_1Q$ by the first party as the shared secret that is to be used in establishing to the third party the association between the second party and the first party. In order to keep the shared secret $s_1Q$ secret whilst providing the third party with the information it needs to verify the association between the first and second parties, the second party combines $s_1Q$ with $s_2$ and makes the resulting combination $s_1s_2Q$ public.

Recapping so far, the elements associated with the first and second parties are:

First party:
   Secret data: $s_1$
   Public data: P,R(=$s_1$P)
Second party:
   Secret Data: $s_2$, $s_1Q$
   Public data: Q, $s_1s_2Q$, $s_2Q$ It is assumed that the third party reliably knows P and R(=$s_1$P), the public data of the first party. The third party has also received, in respect of the second party: the point Q; an element, herein called X, that is purportedly $s_1s_2Q$; and an element, herein called Y, that is purportedly $s_2Q$. In order to check whether X truly does contain $s_1$, the third party checks the following:

$$t(P, X) = t(R, Y) \quad \text{Test 1}$$

Because R=$s_1$P, the above will only be valid if X is equal to $s_1$Y. This would prove that the second party must have a shared secret containing $s_1$ which only it and the first party know (thus proving the association between the parties) were it not for the possibility that, since $s_1$P is public, the second party could have constructed Q as mP, where m∈$F_q$, and then used m, $s_2$ and $s_1$P to construct X as $s_1s_2$ mP and Y as $s_2$ mP. In other words, if the second party can construct its Q from P then, it can pass Test 1 without needing to ask for a shared secret from the first party.

It is therefore necessary for the third party to be satisfied that Q has not been formed by multiplying P by m (it being appreciated that because the discrete logarithm problem is hard, the third party cannot discover if Q of the form mP—though, of course, if m=1, this will be apparent). To this end, the point Q is required to be derived from an identifier string ID using the map-to-point hash function $H_1$ because in this case even if Q happened to be equal to mP (which is highly unlikely), the second party would neither be aware of this nor able to separate out m and use it to generate an X of the form $s_1s_2$ mP. It is not, of course, possible for the second party to work backwards from a value of m to produce the string ID that would give rise to m using the map-to-point function.

To emphasise the fact that Q originates from an identifier, it is suffixed with "ID" in the following discussion; thus:

$$Q_{ID} = H_1(ID)$$

where the identifier string ID can be any string and typically, though not necessarily, serves to identify the second party in plain language.

So now if the second party makes public the string ID rather than (or in addition to) $Q_{ID}$, the third party can use the string ID to form the point $Q_{ID}$ thereby re-assuring itself that the second party has not used a value m to form Q as mP. However, the third party also needs to be able to link this legitimate $Q_{ID}$ to the elements used in Test 1—in particular, the third party needs to be sure that the element Y contains the legitimate $Q_{ID}$ derived from ID. To this end, the third party must carry out a second test for which purpose the second party must provide a further quantity, herein called Z, that is purportedly equal to $s_2$P. The second test is of the following form:

$$t(Z, Q_{ID}) = t(P, Y) \quad \text{Test 2}$$

If this is true, then the second party knows that Y must contain $Q_{ID}$.

The above test (Test 1) is now therefore adequate to prove that the second party does indeed have a shared secret of the form $s_1Q_{ID}$ which must have been provided by the first party, thereby proving there is an association between the first and second parties.

Figure 2:
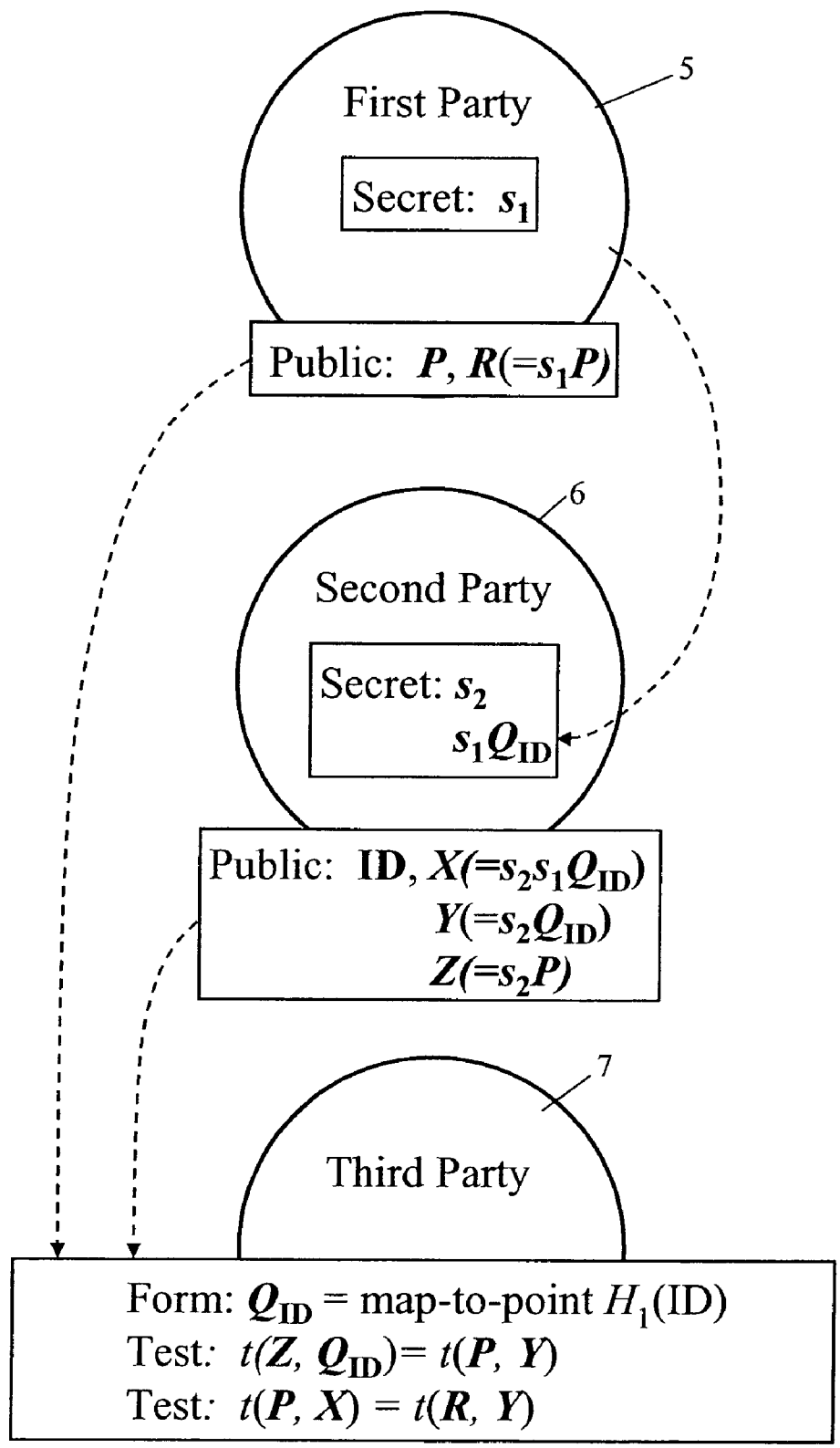
FIG. 2 is a diagram illustrating a first embodiment of the invention illustrating for generalized first and second parties, how a third party can verify an association between first and second parties.

Recapping, and as shown in FIG. 2, the elements associated with the first and second parties 5, 6 are:

First party 5:
   Secret data: $s_1$
   Public data: P, R=$s_1$P
Second party 6:
   Secret data: $s_2$,
   Public data: ID, X=$s_1s_2Q_{ID}$, Y=$s_2Q_{ID}$, Z=$s_2$P
and the third party 7 carries out the following:
   $Q_{ID}$=map-to-point $H_1$(ID);
   Test 2;
   Test 1.

The requirements for the third party to be able to verify the association between the first and second parties (respectively higher-level and lower-level parties in the association hierarchy) can thus be expressed as follows:

the first party must have a public key (P, R)/private key $s_1$ key pair where R=$s_1$P; it may be noted that P could be based on an identity string for the first party by using the map-to-point hash $H_1$.

the second party must have an IBC public key ID/private key $s_1Q_{ID}$ key pair where $Q_{ID}$=$H_1$(ID).

using a secret $s_2$ the second party must form three public verification parameters (X, Y, Z) by multiplying by $s_2$:
   the point P that is part of the public key of the first party,
   the point $Q_{ID}$ of the second party,
   the private part $s_1Q_{ID}$ of the second party's IBC key pair.

In applying the two Tests 1 and 2, the point P is the point that is part of the public key of the first (higher-level) party, the other part of the key being R, whilst the point $Q_{ID}$ is the point derived from the identity of the second (lower-level) party using the map-to-point hash function $H_1$ and the parameters X, Y and Z are all supplied by the second party.

Other ways of characterising the parameters referred to above as the "verification parameters" are also possible; for example, it may be noted that two of these parameters, namely Y(=$s_2Q_{ID}$) and Z(=$s_2$P) can each be viewed as part of the public key of a respective standard public/private key pair that involves the point concerned and has a private key of $s_2$.

Figure 3:
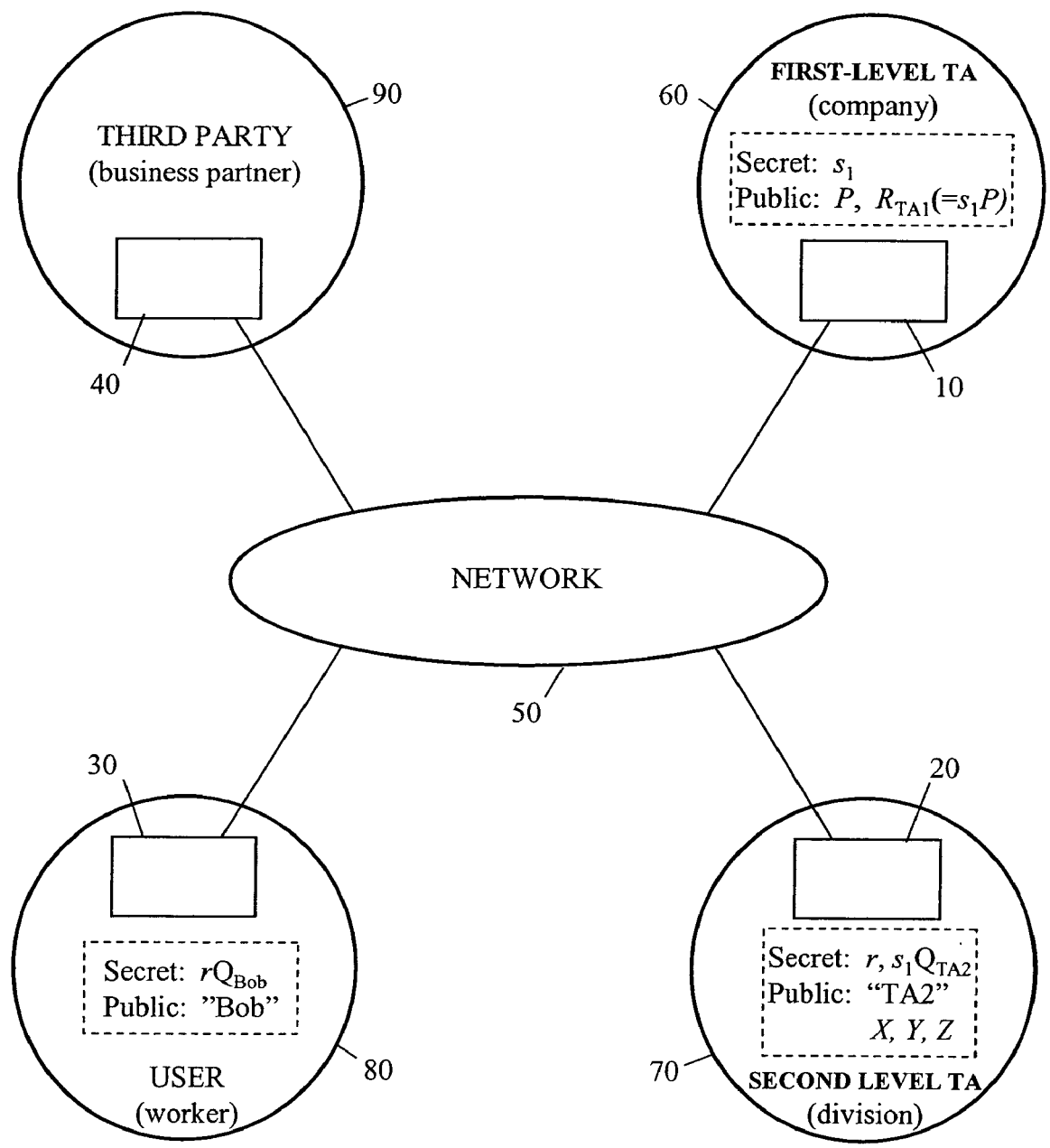
FIG. 3 is a diagram of a second embodiment involving a hierarchy of a first-level trusted authority and a second-level trusted authority.

FIG. 3 illustrates the application of the foregoing to an hierarchical arrangement of two trusted authorities 60 and 70 where the latter has issued a user 80 with an IBC private key.

More particularly, FIG. 3 shows a first computer entity 10, a second computer entity 20, a third computer entity 30 and a fourth computer entity 40 connected via a network 50, for example the Internet. The first computer entity 10 represents a first trusted authority 60, for example a company, the second computer entity 20 represents a second trusted authority 70, for example a division within the company and the third computer entity 30 represents a user 80, for example a worker within the company. The fourth computer entity 40 represents, for example, a business partner 90 of the company that wishes to interact with the user 80.

The first, second, third and fourth computer entities 10, 20, 30, 40 are conventional program-controlled computing devices though specialised hardware may be provided to effect particular cryptographic processes.

The first computer entity 10 and second computer entity 20 form a trusted authority hierarchy in which the first computer entity 10 acts as a root, or first level, trusted authority 60 and the second computer entity 20 acts as a second level trusted authority 70. The first-level trusted authority 60 has a standard public key (P, $R_{TA1}$)/private keys $s_1$ key pair where $R_{TA1}=s_1P$. The second-level trusted authority 20 has an IBC public/private key pair the private key $S_{TA2}$ of which has been generated by the first-level trusted authority 60 using its private key $s_1$ and $Q_{TA2}$, where $Q_{TA2}=H_1(TA2)$ and "TA2" is an identity string associated with the second-level trusted authority 70. Table 1 sets out the keys held by the first-level and second-level trusted authorities 60 and 70.

TABLE 1

| Entity | Standard Private Key | Standard Public key | ID Based Private Key | ID Based Pubic key |
|---|---|---|---|---|
| First-level TA | $s_1$ | P, $R_{TA1}(=s_1P)$ | | |
| Second-level TA | | | $S_{TA2} = s_1Q_{TA2}$ | $Q_{TA2} = H_1(TA2)$ |

Once in the possession of the IBC private key $S_{TA2}$ (the "master private key") the second-level trusted authority 70 is able to produce a set of verification parameters X, Y and Z enabling a third party to verify, without further interaction with the first-level trusted authority and without the need for digital certificates, that the private key of the IBC public/private key pair of the second-level trusted authority 70 could only have been generated by the first-level trusted authority 60. More particularly, the second-level trusted authority 70 selects a random number r where $r \in F_q$; the random number r is a "pseudo-master private key". Once the pseudo-master key has been selected the second-level trusted authority 70 generates the following public verification parameters:

$rs_1Q_{TA2}, rQ_{TA2}$ and rP that respectively correspond to the parameters X, Y and Z of the above-described Tests 1 and 2.

It should be noted that even though in the above example the second-level trusted authority 70 has created a single pseudo-master private key, the second-level trusted authority 70 could generate any number of pseudo-master private keys.

It may also be noted that the second-level trusted authority 70 is likely also to have one or more standard public/private key pairs. For example, the pseudo-master private key r could be used as the private key and combined either with P or $Q_{ID}$ or another point in $G_1$ not computed from an existing point, to form a corresponding public key. Alternatively, a completely separate private key $S_2$ could be generated where $s_2 \in F_q$ and used with P or $Q_{ID}$ or another point in $G_1$ not computed from an existing point, to form a corresponding public key.

The user 80 registers with the second trusted authority 70 to obtain an associated IBC private key for the user's public key, where the user's public key could be any form of identifier, for example the user's name 'Bob', and the map-to-point hash $H_1$ (Bob) of this identifier maps to a point $Q_{Bob}$ in $G_1$. The IBC private key provided to the user 80 is a combination of the user's public key and the second-level trusted authority's pseudo private key i.e. the user's private key is $rQ_{Bob}$.

To send an encrypted message to the user 80, the third-party business partner 90 can now use the IBC public key of the user 80 and the public key of the second-level trusted authority 70 used by user 80; in doing this, the third party 90 can be sure that the user will only be able to decrypt the message if the user is known to the second-level trusted authority 70 since the IBC private key needed for decryption must be provided by that authority.

The third party 90 can also verify that the second-level trusted authority 70 (company division) is associated with the first-level trusted authority (company). To do this, the third party 90 uses the identity "TA2" and public verification parameters $rs_1Q_{TA2}, rQ_{TA2}$ and rP of the second-level trusted authority 70, together with the public key P, $R_{TA1}(=s_1P)$ of the first-level trusted authority 60, to carry out the Tests 1 and 2 described above with respect to FIG. 2. More particularly:

the third party 90 first forms $Q_{TA2}$ from the identity string "TA2" using the map-to-point hash function $H_1$;

the third party 90 carries out Test 2 by checking $t(Z, Q_{TA2})=t(P, Y)$ where $Z=rP$ and $Y=rQ_{TA2}$ and $Q_{TA2}$ is the element just formed from the identity "TA2"; this check, if passed, confirms that the element Y contains $Q_{TA2}$ the third party 90 carries out Test 1 by checking $t(P, X)=t(R_{TA1}, Y)$ where $R_{TA1}=S_1P$ and $X=rS_1Q_{TA2}$; this check, if passed, confirms that X must contain $s_1$ which the second-level trusted authority 70 must have obtained in a non-public element from the first-level trusted authority 60.

Of course, because the second-level trusted authority has published its point $Q_{TA2}$ (or the underlying identifier "TA2") as well as the element $rQ_{TA2}$ thereby providing a standard public/private key pair, it would be possible for the user 80 itself to produce a set of verification parameters to enable the third party 90 to verify the existence of an association between the user 80 and the second-level trusted authority 70 without needing to send a message to the user. To produce the required verification parameters the user 80 picks a random number $r_B$ where $r_B \in F_q$ and generates the parameters:

$r_B r Q_{Bob}, r_B Q_{Bob}$ and $r_B Q_{TA2}$ respectively corresponding to the parameters X, Y and Z. In this case, in the Tests 1 and 2, the element P is, of course, replaced by $Q_{TA2}$ and the element R by $rQ_{TA2}$ as $Q_{TA2}$ is now the point associated with the higher-level party. In fact, where the second-level trusted authority has provided one or more other standard public/private key pairs, the public values of any such pair can be used for the elements P and R in the previously stated forms of the Tests.

Figure 4:
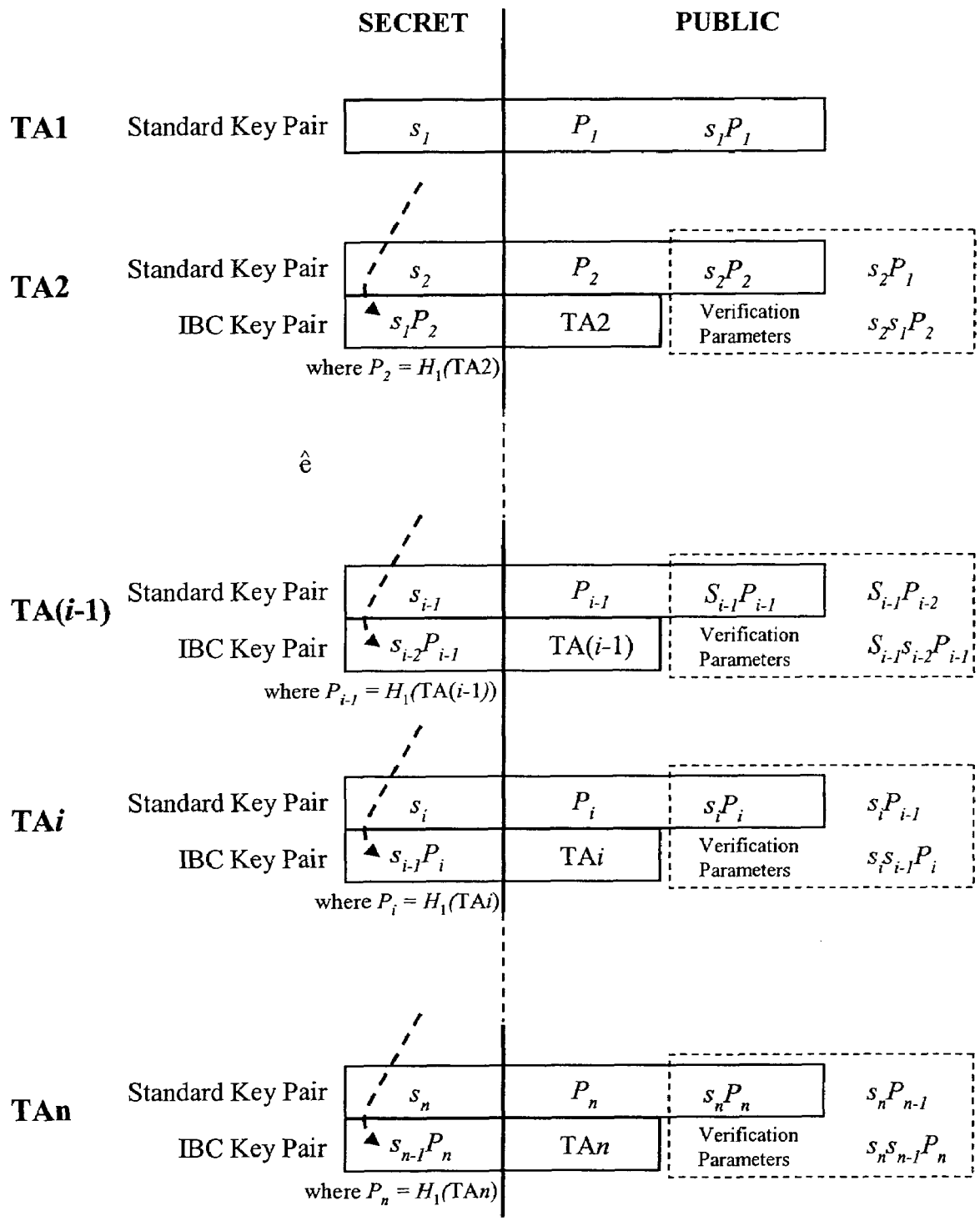
FIG. 4 is a diagram of a third embodiment involving an n-level hierarchy of trusted authorities.

FIG. 4 of the accompanying drawings illustrates for an n-level hierarchy of trusted authorities TA1 to TAn, a possible organisation of keys and verification parameters. In this example, each trusted authority such as authority TAi (where $1 < i <= n$) has:

a standard public/private key pair, the private key of this key pair being a secret $s_i$ and the public key being ($P_i$, $s_i P_i$) where $P_i=H_1$("TAi") that is, the map-to-point hash of the identity of the authority;

an IBC key pair, the public key of this key pair being the identity TAi of the trusted authority and the secret key being the product of the map-to-point hash of this identity and the secret $s_{i-1}$ of the next level up trusted authority;

two additional verification parameters $s_i s_{i-1} P_i$ and $s_i P_{i-1}$ (corresponding to X and Z above, the verification parameter $Y=s_i P_i$ already being present in the public key of the standard key pair).

The root trusted authority TA1 simply has a standard public key($P_1, s_1 P$)/private key $s_1$ key pair.

With this hierarchy, it is possible to verify the association between each parent/child pairing of trusted authorities in the hierarchy thereby enabling a check to be made that any non-root trusted authority, from the lowest level (or leaf) authority upwards, is associated with the root trusted authority.

It will be appreciated that many variants are possible to the above described embodiments of the invention.

The invention claimed is:

1. A method of enabling a second party to prove to a third party the existence of an association between the second party and a first party, the first party being associated with a first element of a first algebraic group, the second party being associated with a second element of a second algebraic group, the second element being formed from an identifier string of the second party using a hash function, and there being a computable bilinear map for the first and second elements, wherein the method comprises:
    a second-party computer entity, acting on behalf of the second party, performing the steps of:
    receiving a shared secret provided by the first party as the product of a first secret and the second element;
    computing first, second and third verification parameters, wherein the first verification parameter is a product of a second secret and said shared secret, the second verification parameter is a product of the second secret and the second element and the third verification parameter is a product of the second secret and the first element; and
    outputting the first, second and third verification parameters for use by the third party, wherein the first, second, and third verification parameters enable the third party to verify the association between the first and second parties by performing checks that use the first, second, and third verification parameters and public information.

2. A method according to claim 1, wherein the second-party computer entity generates a further shared secret from the second secret and an identifier string of a fourth party, the second party outputting this further shared secret to the fourth party for use by the latter as the private key of a public/private key pair the public key of which is formed by the identifier string of the fourth party.

3. A method according to claim 1, wherein the first and second parties are respectively parent and child trusted authorities in a hierarchy of trusted authorities.

4. A method according to claim 1, wherein the first and second algebraic groups are the same.

5. A method according to claim 1, wherein the first and second elements are points on the same elliptic curve.

6. A method of verifying an association between the first and second parties of claim 1 by using a function p providing said bilinear map; the method comprising a third-party computer entity carrying out the following operations using the verification parameters of claim 1:
    computing the second element from the identifier string of the second party;
    carrying out a first check to determine that the following equality is satisfied:
    p(third verification parameter, computed second element)=p(first element, second verification parameter)
    carrying out a second check to determine that the following equality is satisfied:
    p(first element, first verification parameter)=p(first product, second verification parameter) where said first product is a public parameter provided by the first party and corresponds to the product of the first secret and the first element;
    verifying the existence of the association between the first and second parties only where checks are passed.

7. A method according to claim 6, wherein said bilinear mapping function is based on a Tate or Weil pairing.

8. A method of verifying an association between a first party associated with a first element of a first algebraic group, and a second party associated with a second element of a second algebraic group, the first and second elements being such that there exists a bilinear mapping p for these elements, the method comprising:
    a third-party computer entity carrying out the following operations:
    receiving both data indicative of said first element, and a first product formed by the first party from a first secret and the first element;
    receiving in respect of the second party an identifier string and first, second and third verification parameters;
    computing the second element from the identifier string of the second party;
    carrying out a first check to determine that the following equality is satisfied:
    p(third verification parameter, computed second element)=p(first element, second verification parameter)
    carrying out a second check to determine that the following equality is satisfied:
    p(first element, first verification parameter)=p(first product, second verification parameter)
    verifying the existence of the association between the first and second parties only where checks are passed.

9. A method according to claim 8, wherein said bilinear mapping function is based on a Tate or Weil pairing.

10. A method according to claim 8, wherein the first and second algebraic groups are the same.

11. A method according to claim 8, wherein the first and second elements are points on the same elliptic curve.

12. Apparatus arranged to enable a third party to verify an association between the apparatus and a first party that has a first secret and is associated with a first element of a first algebraic group, the apparatus being associated with a second element, of a second algebraic group, and the first and second elements being such that there exists a bilinear mapping p for these elements, the apparatus comprising:
    a memory for holding a second secret and an identifier string associated with the apparatus,
    means for forming said second element from said identifier string using a hash function,
    means for receiving from the first party a shared secret based on said first secret and said first element, and for storing this shared secret in the memory,
    means for computing first, second and third verification parameters, wherein the first verification parameter is a product of the second secret with said shared secret, the second verification parameter is a product of the second secret and said second element and the third verification parameter is a product of the second secret and said first element, and
    means for making available said identifier string and said verification parameters to the third party, wherein the first, second, and third verification parameters enable the third party to verify the association between the first party and the apparatus by performing checks that use the first, second, and third verification parameters and public information.

13. Apparatus according to claim 12, wherein the first and second algebraic groups are the same.

14. A method according to claim 12, wherein the first and second elements are points on the same elliptic curve.

15. Apparatus for allowing a third party to verify an association between a first party associated with a first element of a first algebraic group, and a second party associated with a second element of a second algebraic group, the first and second elements being such that there exists a bilinear mapping p for these elements, the apparatus comprising:

- means for receiving both data indicative of the first element, and a first product formed by the first party from a first secret and the first element;
- means for receiving in respect of the second party both an identifier string, and first, second and third verification parameters;
- a memory for holding information received through the means for receiving;
- means for computing the second element from the identifier string of the second party using a hash function;
- means for carrying out a first check to determine that the following equality is satisfied:
    p(third verification parameter, computed second element)=p(first element, second verification parameter);
- means for carrying out a second check to determine that the following equality is satisfied:
    p(first element, first verification parameter)=p(first product, second verification parameter);
- means responsive to both checks being passed, to confirm that there exists an association between the first and second parties.

16. Apparatus according to claim 15, wherein said bilinear mapping p is based on a Tate or Weil pairing.

17. Apparatus according to claim 15, wherein the first and second elements are points on the same elliptic curve.

18. A method of enabling a second party to prove to a third party the existence of an association between the second party and a first party, the first party being associated with a first element of a first algebraic group, the second party being associated with a second element, of a second algebraic group, formed from an identifier string of the second party using a hash function, and there being a computable bilinear map for the first and second elements, wherein the method comprises:

a second-party computer entity, acting on behalf of the second party, performing the steps of:

(1) receiving a shared secret provided by the first party as the product of a first secret and the second element;

(2) computing:
   (i) a first verification parameter as the product of a second secret with said shared secret,
   (ii) a second verification parameter as the product of the second secret with the second element, and
   (iii) a third verification parameter as the product of the second secret with the first element; and (3) outputting the first, second and third verification parameters for use by the third party, wherein the first, second, and third verification parameters enable the third party to verify the association between the first and second parties by performing checks that use the first, second, and third verification parameters and public information.

* * * * *